(12) United States Patent
Park et al.

(10) Patent No.: US 11,512,893 B2
(45) Date of Patent: Nov. 29, 2022

(54) VACUUM HEAT INSULATOR, METHOD OF MANUFACTURING THE VACUUM HEAT INSULATOR, AND REFRIGERATOR INCLUDING THE VACUUM HEAT INSULATOR

(71) Applicant: Samsung Electronics Co., Ltd., Suwon-si (KR)

(72) Inventors: Jinhyun Park, Suwon-si (KR); Jongsung Park, Suwon-si (KR); Kookjeong Seo, Suwon-si (KR); Sungmin Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/170,045

(22) Filed: Feb. 8, 2021

(65) Prior Publication Data
US 2021/0247130 A1 Aug. 12, 2021

(30) Foreign Application Priority Data
Feb. 6, 2020 (KR) .................. 10-2020-0014438

(51) Int. Cl.
*F16L 59/065* (2006.01)
*F25D 23/06* (2006.01)
*F16L 59/07* (2006.01)

(52) U.S. Cl.
CPC .......... *F25D 23/065* (2013.01); *F16L 59/065* (2013.01); *F16L 59/07* (2013.01); *F25D 2201/124* (2013.01); *F25D 2201/14* (2013.01)

(58) Field of Classification Search
None
See application file for complete search history.

(56) References Cited

U.S. PATENT DOCUMENTS

| 9,404,684 B2 | 8/2016 | Jang et al. |
| 10,493,725 B2 | 12/2019 | Shinoki et al. |
| (Continued) | | |

FOREIGN PATENT DOCUMENTS

| JP | 07-063469 A | 3/1995 |
| JP | 2007-016806 A | 1/2007 |
| (Continued) | | |

OTHER PUBLICATIONS

International Search Report dated May 26, 2021, issued in International Patent Application No. PCT/KR2021/001422.

*Primary Examiner* — Alexander S Thomas
(74) *Attorney, Agent, or Firm* — Jefferson IP Law, LLP

(57) ABSTRACT

A vacuum insulator having a structure that improves thermal insulation performance, a method of manufacturing the vacuum insulator, and a refrigerator including the vacuum insulator are provided. The refrigerator includes an outer case configured to form an external appearance, an inner case provided inside the outer case and forming a storage compartment and a vacuum insulator provided between the outer case and the inner case. The vacuum insulator includes a core material formed of glass fibers having a diameter larger than or equal to 5 μm and smaller than or equal 8 μm, an adsorbent configured to adsorb a heat transfer medium, and an envelope configured to accommodate the core material and the adsorbent.

12 Claims, 6 Drawing Sheets

(56) References Cited

U.S. PATENT DOCUMENTS

| | | | | |
|---|---|---|---|---|
| 2015/0118434 A1* | 4/2015 | Nagarajan | ............... | F25D 23/06 |
| | | | | 428/69 |
| 2015/0159800 A1* | 6/2015 | Kimura | .................. | B32B 27/12 |
| | | | | 428/69 |
| 2015/0159937 A1* | 6/2015 | Jang | ...................... | B32B 17/061 |
| | | | | 312/406.1 |
| 2017/0001405 A1* | 1/2017 | Tsuruga | .................... | B32B 5/02 |
| 2018/0238609 A1* | 8/2018 | Uchida | .................. | F25D 23/06 |

FOREIGN PATENT DOCUMENTS

| | | |
|---|---|---|
| JP | 2014-025536 A | 2/2014 |
| JP | 2018-017314 A | 2/2018 |
| JP | 2019-113078 A | 7/2019 |
| JP | 2019-138531 A | 8/2019 |
| KR | 10-0747477 B1 | 8/2007 |
| KR | 10-1620397 B1 | 2/2011 |
| KR | 10-1752669 B1 | 6/2017 |
| KR | 10-2017-0090889 A | 8/2017 |
| KR | 10-1830374 B1 | 2/2018 |

\* cited by examiner

VACUUM HEAT INSULATOR, METHOD OF MANUFACTURING THE VACUUM HEAT INSULATOR, AND REFRIGERATOR INCLUDING THE VACUUM HEAT INSULATOR

CROSS-REFERENCE TO RELATED APPLICATION

This application is based on and claims priority under 35 U.S.C. § 119 of a Korean patent applications number 10-2020-0014438, filed on Feb. 6, 2020 in the Korean Intellectual Property Office, the disclosure of which is incorporated by reference herein in its entirety.

BACKGROUND

1. Field

The disclosure relates to a vacuum insulator, a method of manufacturing the vacuum insulator, and a refrigerator having the vacuum insulator. More particularly, the disclosure relates to a vacuum insulator having a structure that improves thermal insulation performance, a method of manufacturing the vacuum insulator, and a refrigerator having the vacuum insulator.

2. Description of the Related Art

A refrigerator is an appliance that includes a main body having a storage compartment and a cold air supply system for supplying cold air to the storage compartment, to keep food fresh. The storage compartment includes a refrigerating compartment maintained at about 0° C. to 5° C. to keep food refrigerated, and a freezing compartment maintained at about −30° C. to 0° C. to keep food frozen. In general, the front of the storage compartment is provided to be open such that food is inserted into or withdrawn from the storage compartment therethrough, and the open front of the storage compartment is opened and closed by a door.

In recent years, research is being actively conducted on the heat loss of refrigerators, and there has been increasing attempts to enhance the energy efficiency by enhancing the heat insulation performance of refrigerators. Polyurethane, which is generally used as an insulator, has a thermal conductivity of 20 mK/m·K, and the use of Polyurethane may cause the outer wall of the refrigerator to become thick, which has a difficulty in securing the storage capacity of the refrigerator. In addition, as energy regulations for home appliances worldwide are strengthened, it is required to secure maximum efficiency with less energy.

Therefore, in order to remove such a limitation and increase energy efficiency, there is a need to develop a vacuum insulator with an improved insulation performance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a vacuum insulator having an improved structure so that gas and moisture are effectively removed to keep high vacuum, a method of manufacturing the vacuum insulator, and a refrigerator having the vacuum insulator.

Additional aspects of the disclosure will be set forth in part in the description which follows and, in part, will be apparent from the description, or may be learned by practice of the presented embodiments.

In accordance with an aspect of the disclosure, a refrigerator is provided. The refrigerator includes an outer case configured to form an external appearance, an inner case provided inside the outer case and forming a storage compartment, and a vacuum insulator provided between the outer case and the inner case The vacuum insulator includes a core material formed of glass fibers having a diameter larger than or equal to 5 μm and smaller than or equal 8 μm, an adsorbent configured to adsorb a heat transfer medium, and an envelope configured to accommodate the core material and the adsorbent.

The glass fibers may include a length less than or equal to 150 mm.

The core material may have a porosity greater than or equal to about 80%.

A pore size between the glass fibers may be at least one of: larger than or equal to about 50 μm, or smaller than or equal to about 110 μm.

The vacuum insulator may further include a core material panel formed of the core material in a layered structure having a basis weight less than or equal to about 60 g/m2.

The vacuum insulator may include a core material panel formed of the core material in a layered structure including layers, and the number of the layers is greater than or equal to ten and less than or equal to sixty.

The vacuum insulator may have a thermal conductivity of about 1.1 mW/mK to about 1.45 mW/mK.

The vacuum insulator may include a first envelope arranged at an outside of the core material, a barrier layer arranged between the core material and the first envelope, and a second envelope coupled to the first envelope to form an accommodation space in which the core material and the barrier layer are accommodated.

The vacuum insulator may further include extension portions extending from the first envelope and the second envelope, the extension portions bonded to each other by fusion or adhesion and extending toward an outside of the accommodation space.

The first envelope may include an aluminum foil envelope and the second envelope may include an aluminum or inorganic oxide deposition envelope.

The adsorbent may include at least one material selected from the group consisting of a calcium oxide (CaO), magnesium carbonate (MgCO3), a barium oxide (BaO), molecular sieve, a magnesium oxide (MgO), calcium chloride (CaCl2), activated carbon, silica gel, active alumina, and zeolite.

The adsorbent may include at least one material selected from the group consisting of alkali metal, alkaline earth metal, zirconium (Zr), titanium (Ti), aluminum (Al), vanadium (V), silver (Ag), barium (Ba), nickel (Ni), cobalt (Co), palladium (Pd), niobium (Nb), and iron (Fe).

The barrier layer may include at least one material selected from the group consisting of a metal foil, an inorganic vapor deposition film, and a polymer resin.

In accordance with another aspect of the disclosure, a method of manufacturing a vacuum insulator is provided. The method includes preparing a core material by laminating glass fibers having a diameter larger than or equal to about 5 μm or smaller than or equal to about 8 μm, compressing the laminated glass fibers at a temperature of about 500° C. to 800° C., charging the prepared core material and an adsorbent into an accommodation space formed by one or more envelopes, and performing decompression on the envelope for about 20 minutes or longer under a condition of an internal atmospheric pressure less than or equal to 10-2 torr.

The core material may be prepared by compressing the glass fibers at a pressure less than or equal to about 200 kPa.

The glass fibers may be laminated in a layered structure including layers, and the number of the layers may be greater than or equal to ten and less than or equal to sixty.

After the decompression is performed, a vacuum degree less than or equal to about 0.01 torr may be provided.

Before the decompression is performed, the vacuum insulator may be shaped.

The vacuum insulator may be shaped using various shaped jigs.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings of which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings and, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an" and "the" include plural referents unless the context clearly indicates otherwise. Thus, for example, reference to "a component surface" includes reference to one or more of such surfaces.

It should be further understood that the terms "comprises" and/or "comprising," when used in this specification, identify the presence of stated features, integers, operations, elements, and/or components, but do not preclude the presence or addition of one or more other features, integers, operations, elements, components, and/or groups thereof, unless the context clearly indicates otherwise.

Figure 1:
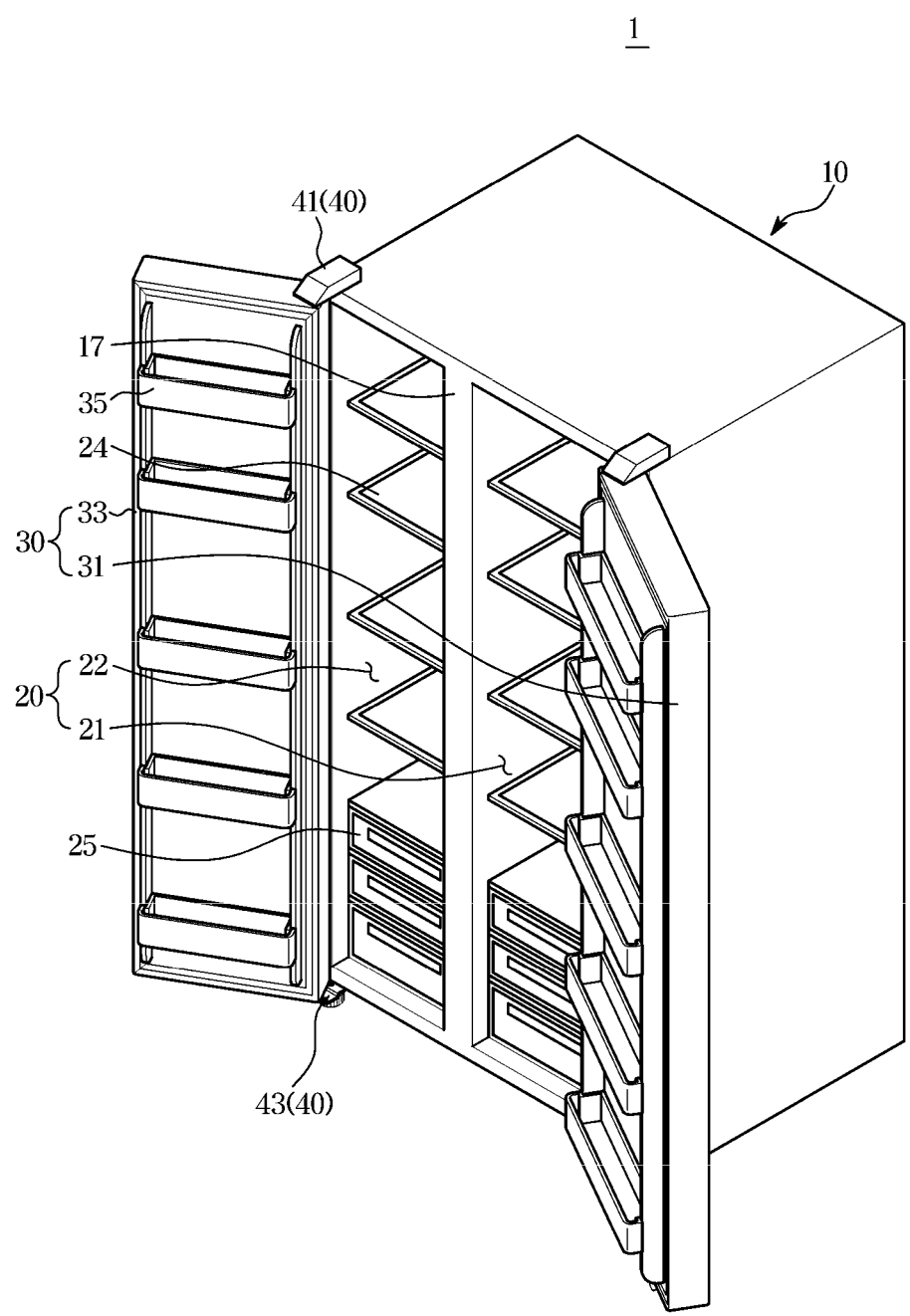
FIG. 1 is a perspective view illustrating the external appearance of a refrigerator according to an embodiment of the disclosure.
Figure 2:
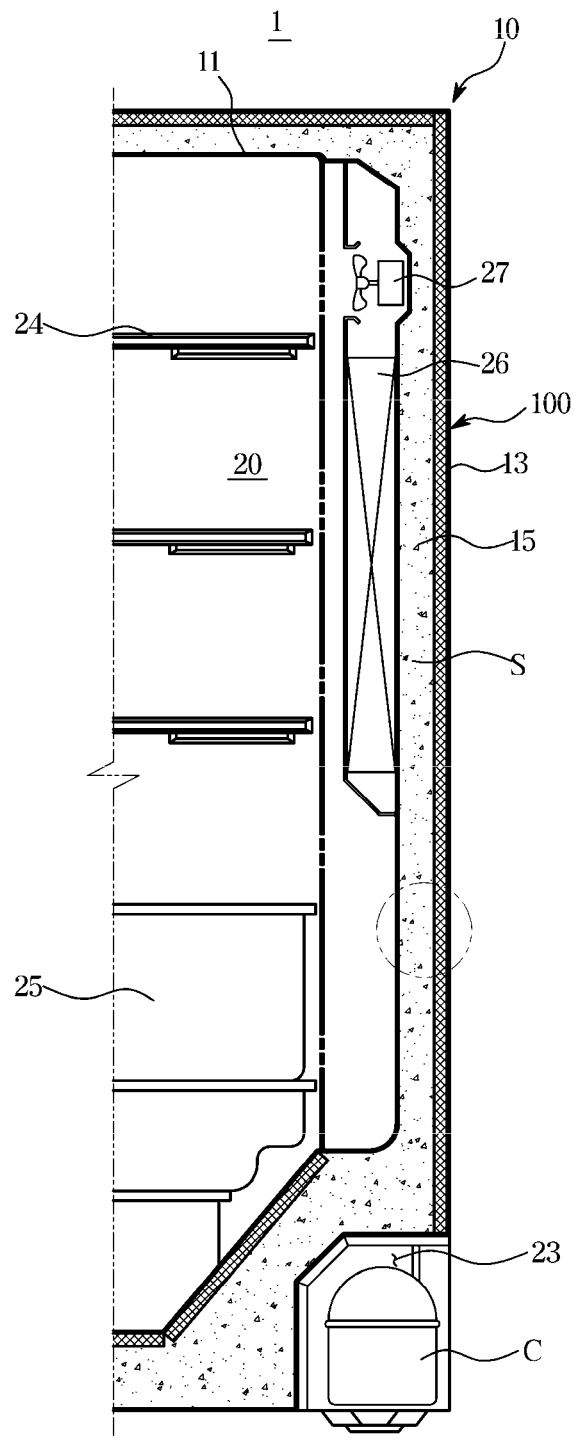
FIG. 2 is a cross-sectional view illustrating the refrigerator according to an embodiment of the disclosure.
Figure 3:
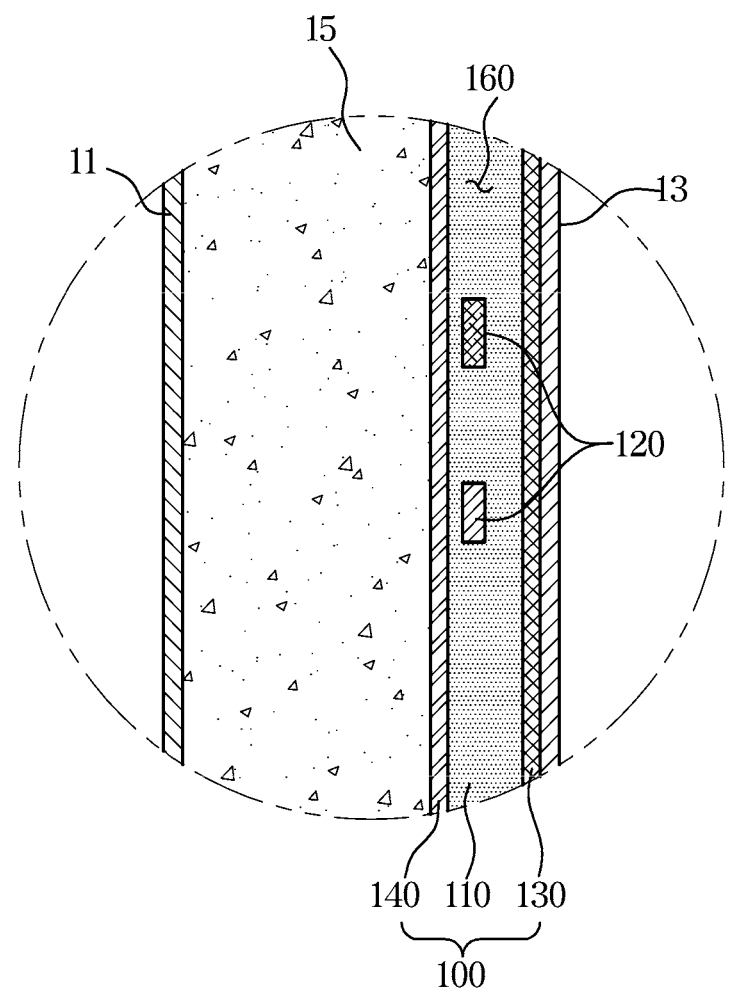
FIG. 3 is an enlarged cross-sectional view illustrating a portion shown in FIG. 2 according to an embodiment of the disclosure.

FIG. 1 is a perspective view illustrating the external appearance of a refrigerator according to an embodiment of the disclosure, FIG. 2 is a cross-sectional view illustrating the refrigerator according to an embodiment of the disclosure, and FIG. 3 is an enlarged cross-sectional view illustrating a portion shown in FIG. 2 according to an embodiment of the disclosure.

Referring to FIGS. 1 to 3, the refrigerator 1 may include a main body 10 forming the external appearance thereof and a storage compartment 20 having a front side that is provided to be open.

The main body 10 may include an inner case 11 forming the storage compartment 20 and an outer case 13 forming the external appearance thereof, and may include a cold air supply device for supplying cold air to the storage compartment 20.

The cold air supply device may include a compressor C, a condenser (not shown), an expansion valve (not shown), an evaporator 26, a blower fan 27, and the like. Between the inner case 11 and the outer case 13, a foam insulator 15 may be foamed to prevent outflow of cold air from the storage compartment 20.

The main body 10 is provided at a rear lower side thereof with a machine room 23 in which the compressor C for compressing a refrigerant and the condenser for condensing the compressed refrigerant are installed.

The storage compartment 20 is divided into a left side and a right side by a partition 17 while a refrigerating compartment 21 is formed at the right side of the main body 10 and a freezing compartment 22 is formed at the left side of the main body 10.

The refrigerator 1 may further include a door 30 that opens and closes the storage compartment 20.

The refrigerating compartment 21 and the freezing compartment 22 may be opened and closed by a refrigerating compartment door 31 and a freezing compartment door 33 that are rotatably coupled to the main body 10, respectively, and a plurality of door guards 35 may be provided on rear surfaces of the refrigerating compartment door 31 and the freezing compartment door 33 to store food and the like.

The storage compartment 20 is provided with a plurality of shelves 24 to divide the storage compartment 20 into a plurality of sections, and articles, such as food, are loaded on the shelf 24.

In addition, the storage compartment 20 is provided with a plurality of storage boxes 25 that are provided to be inserted and withdrawn in a sliding manner.

The refrigerator 1 may further include a hinge module 40 including an upper hinge 41 and a lower hinge 43 that allow the doors 30 to be rotatably coupled to the main body 10.

Referring to FIG. 2, a foam space S is provided between the inner case 11 forming the storage compartment 20 and the outer case 13 coupled to the outside of the inner case 11 to form the external appearance thereof, and the form insulator 15 is foamed in the foam space S.

In order to reinforce the insulation of the foam insulator 15, a vacuum insulator (a vacuum insulation panel: VIP) 100 may be filled together with the foam insulator 15.

The refrigerator according to an aspect of the disclosure includes the outer side forming the external appearance thereof, the inner case provided in the outer case and forming the storage compartment, and the vacuum insulator provided between the outer case and the inner case, in which the vacuum insulator includes a core material including glass fibers having a diameter larger than or equal to 5 µm and smaller than or equal to 8 µm, an adsorbent for adsorbing a heat transfer medium, and an envelope for accommodating the core material and the adsorbent.

Referring to FIG. 3, the vacuum insulator 100 includes envelopes 130 and 140, an adsorbent (a getter) 120, and a core material 110.

The envelopes 130 and 140 serve to maintain the life of the vacuum insulator 100 by blocking fine gas and moisture from penetrating into the inside of the vacuum insulator 100 in a vacuum state The envelopes 130 and 140 of the vacuum insulator 100 may include a first envelope 130 and a second envelope 140.

The first envelope 130 may be arranged at an outside of the core material 110. The second envelope 140 may be coupled to the first envelope 130 to form an accommodation space 160 that accommodates the core material 110 therein. In addition, the second envelope 140 may be coupled to the first envelope 130 to form the accommodation space 160 that accommodates the core material 110 and the adsorbent 120, which is activated at a temperature higher than the room temperature, therein.

The first envelope 130 and the second envelope 140 may be bonded to each other by fusion or adhesion. When the first envelope 130 and the second envelope 140 are bonded to each other by fusion or adhesion to close a gap or passage that allows at least one of gas or moisture to move therethrough, thereby preventing at least one of gas and moisture from penetrating toward the core material 110. Therefore, the heat insulation and durability of the vacuum insulator 100 may be improved.

The first envelope 130 and the second envelope 140 may be formed of materials having the same heat transfer rate or different heat transfer rates.

When the first envelope 130 and the second envelope 140 have different heat transfer rates, the first envelope 130 having a small heat transfer rate may be arranged at an outside of the core material 110 while facing an inner surface of the outer case 13. The second envelope 140 having a large heat transfer rate may be arranged at an outside of the core material 110 while facing an outer surface of the inner case 11, and the second envelope 140 may be coupled to the first envelope 130 to form the accommodation space 160 in which the core material 110 is accommodated.

The first envelope 130 may be bonded to the inner surface of the outer case 13. Since the first envelope 130 having a small heat transfer rate is bonded to the inner surface of the outer case 13, not only the insulation performance is improved, but also moisture and gas are prevented from flowing into the vacuum insulator 100. However, the first envelope 130 is not limited to being bonded to the inner surface of the outer case 13, and the second envelope 140 instead of the first envelope 130 may be bonded to the inner surface of the outer case 13.

Figure 4:
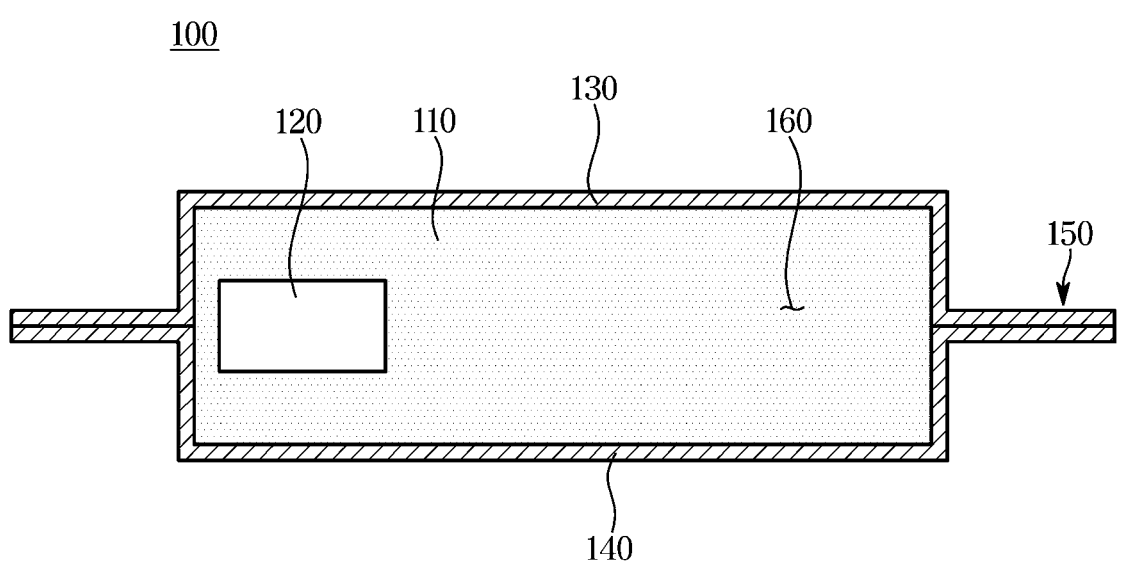
FIG. 4 is a cross-sectional view illustrating a vacuum insulator according to an embodiment of the disclosure.

FIG. 4 is a cross-sectional view illustrating a vacuum insulator according to an embodiment of the disclosure.

Referring to FIG. 4, the first envelope 130 and the second envelope 140 may be coupled to with each other to form an extension portion 150 that extends outward of the accommodation space 160. The extension portion 150 may be formed to extend from opposite sides of the core material 110 in an outward direction. The first envelope 130 and the second envelope 140 are bonded to each other at the extension portion 150 to keep a vacuum state of the accommodation space 160 in which the core material 110 is accommodated. The vacuum insulator 100 includes the adsorbent 120 arranged in the accommodation space 160 to remove at least one of gas and moisture existing in the accommodation space 160.

The adsorbent 120 maintains a vacuum state inside the vacuum insulator 100 by adsorbing a heat transfer medium (gas, moisture, etc.) existing inside the vacuum insulator 100 or introduced from the outside of the vacuum insulator 100.

The adsorbent 120 may be arranged in the accommodation space 160. In detail, the adsorbent 120 may be arranged in the accommodation space 160 to be spaced apart from the envelopes 130 and 140. This is to prevent damage to the envelopes 130 and 140 by heat generated in a process of the adsorbent 120 being activated.

Referring to FIG. 3, the adsorbent 120 may be arranged or inserted into the core member 110.

The adsorbent 120 may be activated to remove at least one of gas and moisture existing in the accommodation space 160 or penetrating into the accommodation space 160 from the outside. In this case, an oxide film on the surface of the adsorbent 120 is removed, and the adsorbent 120 reacts with at least one of surrounding gas and moisture to adsorb the at least one of surrounding gas and moisture.

The adsorbent 120 may include at least one material selected from the group consisting of a calcium oxide (CaO), magnesium carbonate ($MgCO_3$), a barium oxide (BaO), Molecular sieve, a magnesium oxide (MgO), calcium chloride ($CaCl_2$)), activated carbon, silica gel, activated alumina, and zeolite, to adsorb moisture.

In addition, the adsorbent 120 may be formed of a metal material. In detail, the adsorbent 120 may include at least one material selected from the group consisting of alkali metal, alkaline earth metal, zirconium (Zr), titanium (Ti), aluminum (Al), vanadium (V), silver (Ag), barium (Ba), nickel (Ni), cobalt (Co), palladium (Pd), niobium (Nb), and iron (Fe), to adsorb nitrogen, oxygen, and the like.

The adsorbent 120 may be provided to have a different content depending on the initial degree of vacuum inside the vacuum insulator 100, but in an implementation, may be provided to have a content greater than or equal to 0.05 g and less than or equal to 5 g per unit area (0.1 $m^2$) of the envelopes 130 and 140.

The core material 110 serves to maintain the shape of the vacuum insulator, and is formed of a porous material. The core material 110 may be formed of glass fibers having excellent thermal insulation performance.

Glass fibers have an excellent initial performance, but due to a large porosity between fibers, the long-term durability is insufficient. Glass fibers used for vacuum insulators include chopped long glass fibers having a diameter of 7 µm to 12 µm, glass wool having a diameter of 4 µm to 6 µm, and micro fibers having a diameter of 0.3 µm to 3 µm.

The glass fibers used as the core material of the vacuum insulator generally have a structure in which several layers are laminated to improve the orientation of the fibers to improve the thermal conductivity between fibers.

Figure 5:
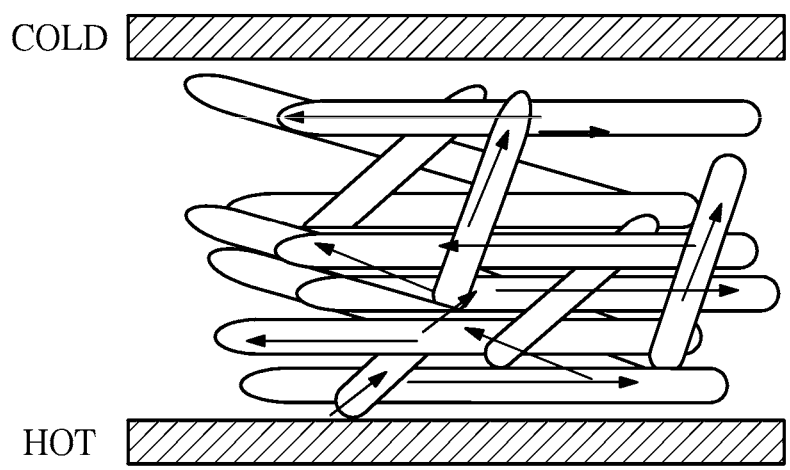
FIG. 5 is a view showing heat conduction of the existing vacuum insulator according to an embodiment of the disclosure.

In the conventional technology of the related art, glass wool is mainly used as a material for the core material. FIG. 5 is a view showing heat conduction of the existing vacuum insulator according to an embodiment of the disclosure. A solid line arrow shown in FIG. 5 shows a path along which heat is conducted from a portion with a high temperature to a portion with a low temperature, and an increasing heat transfer path refers to a great heat resistance, representing that heat insulation is improved.

Referring to FIG. 5, it can be seen that the conventional vacuum insulator includes fibers of which the shapes and lengths are random, so that a large number of fibers are oriented in the Z-axis direction, having non-uniform pores.

According to the disclosure, the vacuum insulator is implemented by laminating glass fibers having a relatively small diameter, that is, a diameter larger than or equal to 5 μm and smaller than or equal to 8 μm, so that the vacuum insulator is provided with uniform and dense pores. As the pore size of pores between the glass fibers is smaller, the influence of radiation, which is related to the thermal insulation performance, may be minimized, so that the thermal insulation performance may be improved.

Figure 6:
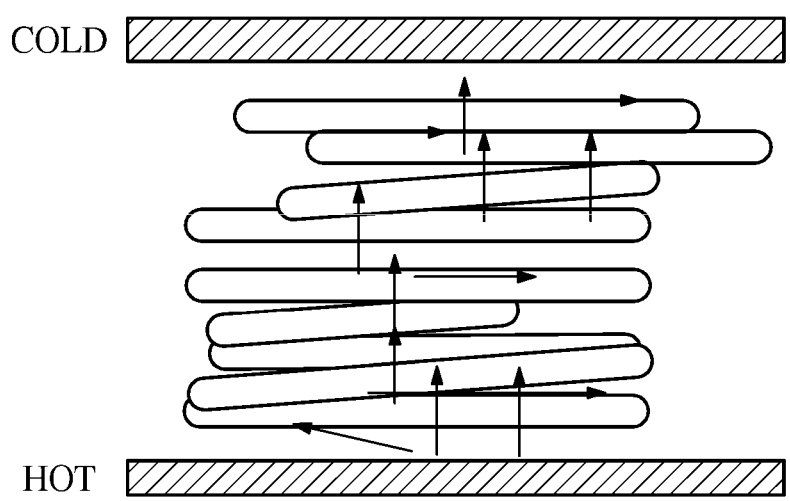
FIG. 6 is a view showing heat conduction of the vacuum insulator according to an embodiment of the disclosure.

FIG. 6 is a view showing heat conduction of the vacuum insulator according to an embodiment of the disclosure.

Referring to FIG. 6, the vacuum insulator has a layered structure of woven panels each woven with glass fibers having a relatively small diameter, to minimize the pore size of pores between the glass fibers and minimize glass fibers oriented in the Z axis direction, so that the heat transfer path may be increased and the heat insulation may be improved.

The glass fiber may have a diameter larger than or equal to 5 μm and smaller than or equal to 8 μm.

As the diameter of the glass fiber increases, the thermal conductivity becomes higher. In other words, as the diameter of the glass fiber decreases, the heat insulation performance is improved. As the diameter of the glass fibers decreases, the pore size of pores between the glass fibers decreases, which increases a heat transfer path in which heat is transferred through the glass fibers, thereby improving the heat insulation performance. According to the disclosure, in order to secure the insulating performance of the glass fibers used for the core material, the upper limit of the diameter of the glass fiber is set to 8 μm.

When considering only the insulation performance, the glass fiber diameter may be provided as small as possible. However, when the diameter of the glass fiber is excessively small, it may be difficult to secure the vacuum state inside the vacuum insulator 100. In detail, when the diameter of the glass fiber is excessively small, the glass fiber may be arranged excessively densely in the accommodation space 160. Since the glass fibers densely arranged in the accommodation space 160 may hinder the adsorption action of the adsorbent 120 on a target material, the lower limit of the diameter of the glass fiber is set to 5 μm.

On the other hand, in the case of manufacturing the core material by laminating glass fibers, the longer the length of the glass fibers is, the more difficult it is to laminate the glass fibers, which causes a difficulty in securing the number of laminated layers, and a difficulty in forming a uniform grid. Accordingly, the length of the glass fibers may be set to 150 mm or less.

According to the disclosed embodiment, a layered structure of woven panels woven with glass fibers having a relatively small diameter is formed so that the pore size of pores between glass fibers is minimized. In detail, the pore size of pores between glass fibers may be set in a range of 50 μm or larger and 110 μm or smaller.

The core material panel may be formed by laminating glass fibers having a diameter and length described above. For example, in consideration of the heat insulation performance and the vacuum insulator, the core material panel may be formed by laminating glass fibers in a range of ten layers to sixty layers. The basis weight of the core material panel formed by laminating glass fibers may be 60 g/m2 or less.

Meanwhile, the vacuum insulator 100 may further include a barrier layer (not shown).

The barrier layer may be provided between at least one of the first envelope 130 and the second envelope 140 and the core material 110 to prevent moisture and gas from penetrating into the accommodation space 160.

In an implementation, the barrier layer may be installed on the inner surface of any one of the envelopes 130 and 140 into which at least one of gas and moisture may be relatively easily permeable. That is, the barrier layer may be arranged between the core material 110 and the first envelope 130 to prevent at least one of gas and moisture from penetrating into the accommodation space 160 through the first envelope 130.

The barrier layer may be accommodated in the accommodation space 160 together with the core material 110, and may be bonded to at least one of the first envelope 130 and the second envelope 140 to form an integral body with the at least one of the first envelope 130 and the second envelope 140. In an implementation, the barrier layer may be bonded to the first envelope 130 to form an integral body with the first envelope 130.

The barrier layer may include at least one of a metal foil, an inorganic deposition film, and a polymer resin.

The vacuum insulator may be manufactured by charging the above-described core material and adsorbent into the envelope accommodation space, and performing vacuum pumping for 20 minutes or more under a condition of 10-2 torr or less of internal atmospheric pressure.

The vacuum insulator manufactured as the above may have a thermal conductivity of about 1.1 mW/mK to 1.45 mW/mK based on a size of 300*300 mm, and when the vacuum insulator is used for a refrigerator, the set energy efficiency may be improved by 1.0% to 2.0%.

Next, a method of manufacturing a vacuum insulator will be described.

A method of manufacturing a vacuum insulating agent according to another aspect of the disclosure includes preparing a core material by laminating glass fibers having a diameter of 5 μm or more and 8 μm or less and compressing the laminated glass fibers at a temperature 500° C. to 800° C. (S1), preparing an envelope in the form of an envelope and inserting the prepared core material and an adsorbent into the envelope (S2), and performing decompressing on the inside of the envelope for 20 minutes or more under a condition of $10^{-2}$ torr or less of internal atmospheric pressure (S3).

According to the disclosed embodiment, in the manufacturing of the core material, glass fibers having a diameter of 5 μm or more and 8 μm or less are laminated in a range of ten layers to sixty layers, and the laminated structure of glass fibers is subject to hot pressing at a temperature of 500° C. to 800° C. and a pressure of 200 kPa or less, so that a core material panel is manufactured.

Next, an envelope-shaped envelope is prepared, a dry type core material and an adsorbent are inserted into the envelope, and the inside of the envelope is subject to a decompressing process so that the inside of the envelope is provided with a high vacuum state.

As an example, the decompressing process may be performed in a vacuum chamber.

In detail, the inside of the envelope subjected to the decompressing treatment process through vacuum pumping for 20 minutes or more under a condition of $10^{-2}$ torr or less of an internal atmospheric pressure may have a vacuum degree of 0.01 torr or less.

The manufacturing of the vacuum insulator may further include shaping the vacuum insulator in various three-dimensional shapes (S4). The shaping of the vacuum insulator may be performed before the decompressing treatment. In this case, various shaped jigs may be used to form a vacuum insulator in various three-dimensional shapes. When the vacuum insulator is shaped after completion of the vacuum insulator, that is, after forming a high-vacuum state in the envelope, the envelope may be damaged. Therefore, it is difficult to shape the vacuum insulator in various three-dimensional shapes after completion of the vacuum insulator.

When the shaping process of the vacuum insulator 100 is completed, the envelope is sealed, and the is subjected to decompressing treatment at a temperature of 500° C. to 800° C. to form a high vacuum state in the envelope.

With the refrigerator according to the disclosed embodiment, the vacuum insulator is manufactured by laminating relatively small glass fibers having a diameter of 5 µm or more and 8 µm or less, so that, unlike the conventional technology of the related art, the pore size of pores between the glass fibers may be minimized while minimizing the number of fibers oriented in the Z-axis direction, and thus the heat transfer path may be increased, which increases the thermal insulation.

In addition, since the refrigerator including the vacuum insulator according to the disclosed embodiment employs a dry lamination method for the lamination of the core material, so that the vacuum insulator may be provided with a thin thickness.

As is apparent from the above, the vacuum insulator, the method of manufacturing the vacuum insulator, and the refrigerator including the vacuum insulator can be provided with an improved structure that improves the heat insulation performance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator comprising:
   an outer case configured to form an external appearance;
   an inner case provided inside the outer case and forming a storage compartment; and
   a vacuum insulator provided between the outer case and the inner case,
   wherein the vacuum insulator includes:
      a core material formed of glass fibers having a diameter larger than or equal to 5 µm and smaller than or equal 8 µm,
      an adsorbent configured to adsorb a heat transfer medium, and
      an envelope configured to accommodate the core material and the adsorbent,
   wherein the vacuum insulator has a thermal conductivity of about 1.1 mW/mK to about 1.45 mW/mK, and
   wherein the vacuum insulator further includes a core material panel formed of the core material in a layered structure having a basis weight less than or equal to about 60 g/m².

2. The refrigerator of claim 1, wherein the glass fibers include a length less than or equal to 150 mm.

3. The refrigerator of claim 1, wherein the core material has a porosity greater than or equal to about 80%.

4. The refrigerator of claim 1, wherein a pore size between the glass fibers is at least one of:
   larger than or equal to about 50 µm, or
   smaller than or equal to about 110 µm.

5. The refrigerator of claim 1,
   wherein a number of layers in the layered structure is greater than or equal to ten and less than or equal to sixty.

6. The refrigerator of claim 1, wherein the vacuum insulator includes:
   a first envelope arranged at an outside of the core material;
   a barrier layer arranged between the core material and the first envelope; and
   a second envelope coupled to the first envelope to form an accommodation space in which the core material and the barrier layer are accommodated.

7. The refrigerator of claim 6,
   wherein the vacuum insulator further includes extension portions extending from the first envelope and the second envelope, and
   wherein the extension portions are bonded to each other by fusion or adhesion and extending toward an outside of the accommodation space.

8. The refrigerator of claim 6,
   wherein the first envelope includes an aluminum foil envelope, and
   wherein the second envelope includes an aluminum or inorganic oxide deposition envelope.

9. The refrigerator of claim 6, wherein the barrier layer includes at least one material selected from a metal foil, an inorganic vapor deposition film, or a polymer resin.

10. The refrigerator of claim 1, wherein the adsorbent includes at least one material selected from a calcium oxide (CaO), magnesium carbonate ($MgCO_3$), a barium oxide (BaO), a molecular sieve, a magnesium oxide (MgO), a calcium chloride ($CaCl_2$), activated carbon, a silica gel, active alumina, or a zeolite.

11. The refrigerator of claim 1, wherein the adsorbent includes at least one material selected from alkali metal, alkaline earth metal, zirconium (Zr), titanium (Ti), aluminum (Al), vanadium (V), silver (Ag), barium (Ba), nickel (Ni), cobalt (Co), palladium (Pd), niobium (Nb), or iron (Fe).

12. The refrigerator of claim 1, wherein the glass fibers have been compressed at a pressure less than or equal to about 200 kPa.

* * * * *